June 8, 1937. S. FOULKS 2,083,366
SELF-PHOTO ATTACHMENT FOR CAMERAS
Filed June 6, 1936
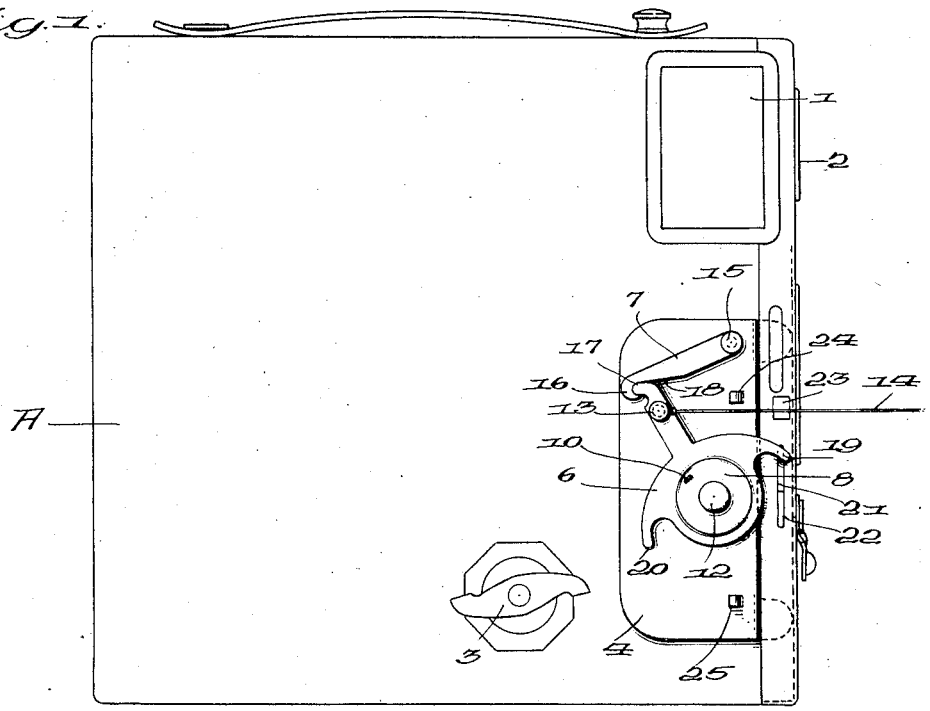
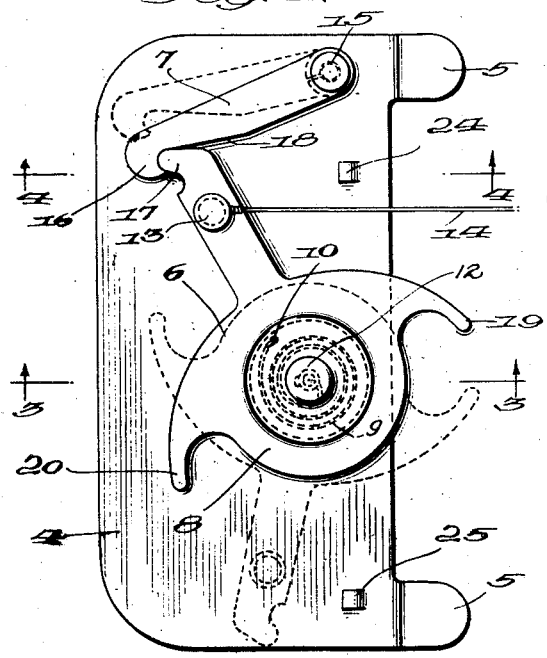
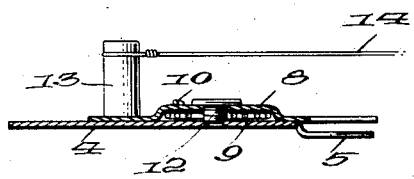
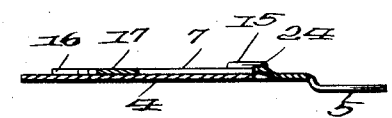
Inventor
Samuel Foulks
Vernon E. Hodges
By H. Hamlin Hodges
his Attorneys Patented June 8, 1937

2,083,366

UNITED STATES PATENT OFFICE 2,083,366

SELF-PHOTO ATTACHMENT FOR CAMERAS

Samuel Foulks, Brooklyn, N. Y.

Application June 6, 1936, Serial No. 83,981

4 Claims. (Cl. 95—53)

My invention relates to an improvement in self photo attachments for cameras.

The object is, as the name implies, namely to provide an attachment for any camera of the so-called "Brownie" type, which may be operated at a distance from the camera, either for a snap-shot or time exposure, to enable the operator of the camera to appear in the picture.

While various schemes have been employed for accomplishing this general object, they have been expensive and intricate. My invention is simple, inexpensive, capable of being easily and quickly applied to or removed from a camera, and can be sold as an attachment or as standard equipment.

In the accompanying drawing:

Fig. 1 is a view in elevation of a camera showing my attachment applied;

Fig. 2 is an enlarged detail of the attachment detached from the camera;

Fig. 3 is a section on line 3—3 of Fig. 2, looking in the direction of the arrows; and Fig. 4 is a section on the line 4—4 looking in the direction of the arrows.

A, represents a camera of any suitable construction, preferably of the so-called "Brownie" type. It has the usual finder 1 on the side, back of which is a lens 2, and the means 3 for reeling the film.

My attachment is preferably stamped from a piece of sheet-metal, and is in the form of a flat plate 4 of suitable size. This fits over the front of a camera and is provided with the tongues 5 which are slightly offset as shown in Figs. 3 and 4, and are adapted to be inserted under the front edge of the camera as indicated by dotted lines in Fig. 1, the sheet-metal portion 4 thus resting flat against the side of the camera as viewed in Figs. 1, 3 and 4.

There are two levers pivoted to the plate 4. The lever 6 is termed a cam lever, and the lever 7 is a locking lever. The hub 8 of the cam lever is stamped up from the center to form a housing for the spiral spring 9, one end 10 of which protrudes through the housing and is attached thereto, and the other end 11 through the plate as illustrated in Figs. 2 and 3, and this spiral spring is wound around the central pivot 12, and it actuates the cam lever as will be explained, tending to turn it from the position in full lines of Fig. 2 to the position in dotted lines in Fig. 2. A post 13 is erected on the cam lever, and to this a thread or cord 14 is attached and leads off several feet to the place where the operator is stationed, and is adapted to be pulled when the operator desires to move the shutter either for snap-shot or time exposure.

The locking lever 7 is pivoted at 15, and has a hook 16 on its free end adapted to engage the end 17 of the cam lever in order to lock the latter in one of its extreme positions, in the position shown in Figs. 1 and 2, preparatory to an exposure. This locking lever has a cam surface 18, which lies in the path of the end 17, whereby the locking lever is forced aside when the thread or cord 14 is pulled to the right, so that the hook 16 is removed and the way cleared for the end 17 to pass the hook when released, and the cam lever is turned by the spring 9 to the position shown in dotted lines in Fig. 2.

The cam lever is provided with two fingers 19 and 20, and these are for the purpose of gauging the shutter-lever 21 (see Fig. 1), which shutter lever swings back and forth in the slot 22 providing guidance and clearance therefor, and which is common to various forms of cameras.

To take a picture, the camera is placed on a stand or tripod, and the group is stationed in front thereof. The operator looks through one of the finders, such as 1, and gets the group or object to be photographed properly focused. The cam lever is first set in the position shown in Fig. 1, and in full lines in Fig. 2, where it is held by the hook 16 of the locking lever 7.

The operator then takes a position in front of the camera, and he—or in fact anyone else—can pull the thread or cord 14 gently, the effect of which is to force the finger 19 against the shutter lever 21, which latter thereupon snaps to the opposite end of the slot 22 in the usual fashion. The movement of the cam lever resulting from the pull of the thread or string 14 by traversing the cam edge 18 of the locking lever forces the hook 16 of the latter aside out of the path of the end 17 of the cam lever, and now by releasing the string or thread 14 the cam lever is turned by the spring 9 to the position as shown in dotted lines in Fig. 2, carrying the post 13 to the other side of the pivot 12.

By again pulling the string or thread 14, the finger 20 of the cam lever is in position to reverse the shutter lever 21, that is to say causing it to snap back to the opposite end of the slot 22, thus enabling the operator to take the entire picture, if a snap-shot; or, if a time exposure, to close the shutter.

To take a time exposure, the exposure lever 23 is pulled out in the usual manner. When a time exposure is taken, the operator pulls the cam lever first in one direction for engagement of the finger 19 with the upper side of the shutter lever 21 to move the shutter-lever in one direction to open the shutter and then he releases the tension on the thread or cord 14 allowing the spring 9 to turn the cam lever 6 to the dotted line position in Fig. 2, and after counting the required number of seconds (to give the desired length of exposure), he pulls the string or thread again pressing the finger 20 against the under side of the shutter 21 and moving it upward to cause the shutter to close.

Stops 24 and 25 are struck up from the plate 4, or may be placed thereon in position to limit the extreme movements in opposite directions of the cam lever 6, they being in the direct path of the arm of the free end of the latter. Some sort of mark or symbol gauge could be provided to indicate the exact position the attachment should take, but as a general rule it may be said it is an equal distance from the finder 1 and the opposite edge of the camera as clearly shown in Fig. 1, and when properly placed, the cam lever should always be able to strike stop 24 or 25 in each of its extreme positions.

The device is so simple and easy to use that it can be operated by a child or any inexperienced person without difficulty, and the device may be applied to the camera quickly and by the exercise of ordinary skill.

I claim:

1. A self-photo attachment for a camera of the type having a shutter lever movable in opposite directions to open and close the shutter thereof, including a plate, a spring-actuated cam lever pivoted thereto, and having fingers on opposite sides of the pivot in position to alternately actuate the shutter-lever in opposite directions, a locking lever pivoted to the plate and having a hook at its free end in position to engage and hold the free end of the cam lever in one position, the locking lever having a cam surface extending from the hook and in position to be traversed by the end of the cam lever when pulled in one direction, whereby the hook is forced aside by the end of the cam lever and out of the path of the latter to enable the cam lever to reverse its position due to the tension of the spring and when permitted to do so, and means for actuating said cam lever in opposite directions from a remote point.

2. A self-photo attachment for a camera of the type having a shutter lever movable in opposite directions to open and close the shutter thereof including a plate, a spring-actuated cam lever pivoted thereto, and having fingers on opposite sides of the pivot in position to alternately engage and actuate the shutter-lever, a locking lever pivoted to the plate and having a hook at its free end in position to engage and hold the free end of the cam lever in one position, the locking lever having a cam surface extending from the hook and in position to be engaged and traversed by the end of the cam lever when pulled in one direction, whereby the hook is forced aside by the end of the cam lever and out of the path of the latter to enable the cam lever to reverse its position due to the tension of the spring and when permitted to do so, and means for actuating the cam lever from a remote point.

3. The combination with a camera, and a shutter-lever, of an attachment for the camera including a plate having means for fastening it to the camera in proximity to the shutter lever, a spring-actuated cam lever pivoted to the plate, said cam lever having fingers on opposite sides of the pivot in position to alternately engage and move the shutter lever in opposite directions, means for locking the cam lever in one position, means for releasing said locking means upon movement of the cam lever in one direction, and means connected with the cam lever and extending to a remote point for moving the cam lever in said direction to effect its release and to move the shutter lever in one direction, permitting the cam lever to swing in the opposite direction due to the action of the spring when said moving means is released.

4. As an article of manufacture, a self-photo attachment for a camera of the type having a shutter lever movable in opposite directions to open and close the shutter thereof, including a plate having means for removably attaching it to a camera, a spring-actuated cam lever pivoted to the plate and movable between two extreme positions, the cam lever having fingers in position to alternately engage a shutter lever and move the same in opposite directions, means for holding the cam lever in one position and releasable upon movement of the cam lever in one direction, and means for operating said cam lever from a remote point, said fingers being spaced on different sides of the cam lever in position whereby one finger engages and moves the shutter lever when the cam lever is actuated in one extreme position and the other finger engages and moves the shutter lever when the cam lever is in the other extreme position.

SAMUEL FOULKS.